United States Patent
Barnekow et al.

(10) Patent No.: US 9,930,904 B2
(45) Date of Patent: Apr. 3, 2018

(54) SOLID PREPARATIONS READY FOR CONSUMPTION

(71) Applicant: Symrise AG, Holzminden (DE)

(72) Inventors: Sylvia Barnekow, Marienmünster (DE); Martina Batalia, Boffzen (DE); Ingo Lindner, Holzminden (DE)

(73) Assignee: Symrise AG, Holzminden (DE)

( * ) Notice: Subject to any disclaimer, the term of this patent is extended or adjusted under 35 U.S.C. 154(b) by 36 days.

(21) Appl. No.: 14/554,753

(22) Filed: Nov. 26, 2014

(65) Prior Publication Data
US 2015/0150283 A1    Jun. 4, 2015

(30) Foreign Application Priority Data

Nov. 30, 2013  (EP) .................................... 13195215

(51) Int. Cl.
| | |
|---|---|
| *A23P 1/02* | (2006.01) |
| *A23P 1/08* | (2006.01) |
| *A23L 1/00* | (2006.01) |
| *A21D 2/18* | (2006.01) |
| *A21D 10/00* | (2006.01) |
| *A23P 10/22* | (2016.01) |
| *A23P 20/12* | (2016.01) |
| *A23P 20/18* | (2016.01) |
| *A23L 29/30* | (2016.01) |
| *A23L 27/00* | (2016.01) |
| *A23L 7/117* | (2016.01) |

(52) U.S. Cl.
CPC .............. *A23L 1/005* (2013.01); *A21D 2/181* (2013.01); *A21D 10/005* (2013.01); *A23L 27/70* (2016.08); *A23L 29/35* (2016.08); *A23L 29/37* (2016.08); *A23P 10/22* (2016.08); *A23P 20/12* (2016.08); *A23P 20/18* (2016.08); *A23L 7/117* (2016.08); *A23V 2002/00* (2013.01)

(58) Field of Classification Search
CPC ........... A23P 20/18; A23L 1/005; A23L 27/70
See application file for complete search history.

(56) References Cited

U.S. PATENT DOCUMENTS

| | | |
|---|---|---|
| 3,663,369 A | 5/1972 | Morehouse et al. |
| 2005/0095328 A1 | 5/2005 | Barber et al. |
| 2008/0006964 A1 | 4/2008 | Subramanian et al. |
| 2009/0155423 A1 | 6/2009 | Moore et al. |
| 2013/0216677 A1* | 8/2013 | Jensen .................... A23L 7/191 426/548 |

FOREIGN PATENT DOCUMENTS

WO    WO 2007010396 A2 *  1/2007  ............... A23G 3/34

OTHER PUBLICATIONS

"Ciinnamon" Drugs.com, pp. 1-2 printed Aug. 2016, https://www.drugs.com/npc/cinnamon.html.*
Liu et al, "Glass Transition and Enthalpy Relaxation of Amorphous Food Saccharides: A Review," J. Agric. Food Chem. 2006, vol. 54, pp. 5701-5717.

* cited by examiner

*Primary Examiner* — Kelly Bekker
(74) *Attorney, Agent, or Firm* — Dilworth & Barrese, LLP

(57) ABSTRACT

A solid preparation ready for consumption is proposed, where the surface has edible particles proportionately, which are fixed by means of a substance system that has a glass transition temperature between about 45 and about 75° C.

18 Claims, No Drawings

SOLID PREPARATIONS READY FOR CONSUMPTION

FIELD OF THE INVENTION

The invention is in the field of foodstuffs and relates to new solid preparations for consumption that are finished with edible particles in an improved manner, a corresponding method of production and the use of a preparation for applying to solid surfaces.

PRIOR ART

In the case of products suitable for consumption—or generally foodstuffs—it is often desirable to finish them with edible substances. Generally these may either be coatings or actual particles that are fixed on the surface. This type of finishing may serve for decoration or for improving the outward appearance, but may also alter the sensory properties of the foodstuff, for example the taste.

Edible films and coatings containing or consisting of proteins have long been state of the art, as described for example in J. A. Torres in "Edible Films and Coatings from Protein", (in "Protein functionality in food systems", published by N. S. Hettiarachchy, G. R. Ziegeler), Marcel Dekker, New York, 1994, p. 467-507 or Indian Food Industry 2000, Vol. 19, No. 9 (January-February) p. 36-47.

For example, edible film formers for coating pharmaceuticals or foodstuffs, which contain a film-forming amount of cellulose polymers and maltodextrin and a plasticizer, are known from EP 0527153 B1 (Berwind).

In contrast, particle fixation on foodstuffs typically involves the use of sugar-containing fixing systems, for example glazes, or of fat-containing fixing systems, for example so-called fat-based coatings. However, sugar-containing glazes have the disadvantage that they require a subsequent drying step, they also have a definite sweetness and therefore have a considerable effect on the taste of the food. Fat-containing fixing systems give the foodstuff a higher fat content, which is a disadvantage especially in the case of reduced-fat or low-fat foods. Furthermore, with increasing fat content, the taste of the food is also altered. For these reasons, both the sugar-containing and the fat-containing fixing systems of the prior art are unsatisfactory.

The aim of the present invention was therefore to overcome the aforementioned disadvantages of the prior art and in particular to provide mixtures for fixing particles on foodstuffs, which are easy to apply, ensure a stable bond, are transparent, or even impart a gloss effect, have only a very slight intrinsic taste or none at all, and do not require a separate drying step.

DESCRIPTION OF THE INVENTION

The invention relates to a solid preparation ready for consumption, wherein the surface has non-uniformly-distributed edible particles, which are fixed by means of a fixing system that has a glass transition temperature between about 45 and about 85° C.

It was found, surprisingly, that systems of substances of the type described, especially selected carbohydrates, are eminently suitable for fixing edible particles of the most varied kinds, which have a maximum particle diameter of about 20 mm, on the surfaces of foodstuffs. The adhesive force consists firstly of a mobile capillary bridge bond, which then, on cooling of the melt, is transformed as a result of vitrification into a solid bridge. This is considerably more stable than alternative solutions from the prior art and moreover is neutral in taste, transparent and is not hygroscopic. In this way it is in particular possible, instead of uniform coating, to provide the surface proportionately with particles, as these are merely fixed. This leads to an advantageous aesthetic form, because the edible particles are recognizable as such and it is also perceived by the consumer with respect to taste otherwise than a complete coating. As the melts can be sprayed and sprinkled on with commercially available systems, the method can be carried out even without special technical expenditure. It is particularly useful that a drying step is not required.

With the fixation according to the invention of edible particles on the surface of foodstuffs, improved or novel products may be obtained in an ideal way, especially with respect to visual appearance and/or taste. On the basis of the fixing system according to the invention—which expressly is not a coating—entirely new compositions may be formulated with the most varied particles, making it possible, during consumption of the novel food products, to perceive various taste experiences, simultaneously, but especially successively, during consumption. The appearance and the taste experience may therefore be varied at will, especially if particles with different appearance and taste have been fixed on the foodstuff. Thus, with the particle fixation according to the invention it is possible to produce snacks that are characterized not only by a novel texture and a novel bite sensation, but also by a novel appearance and especially by an improved and novel taste experience.

Edible Solid Preparations

The edible solid preparations are preferably carbohydrate-containing products, especially nibbles, e.g. potato crisps.

The edible particles are selected from the group comprising dry products, spices, sweeteners and aromatic substances, and the fixing system used for fixing contains or consists of at least one carbohydrate. The proportion of edible particles and fixing system together is about 1 to about 10 wt %, based on the solid. This will be explained in more detail below.

Method of Production

The invention further relates to a method of production of a solid preparation ready for consumption, on the surface of which particles of active substance are fixed proportionately, in which
(a) a fixing system is heated until a melt is formed,
(b) the resultant melt is sprayed using one or more nozzles,
(c) the edible particles are led through the resultant aerosol or the fine droplets that form, are wetted there and are led onto the solid preparation ready for consumption, (d) the resultant product is cooled until the melt solidifies to a glass.

I. Solids

Preferred solid preparations that are suitable for consumption and are supplied with the edible particles are carbohydrate-rich products, e.g. flour or starch products, especially baked products, fried foodstuffs or dried extruded foodstuffs. Typically, the particles are applied on pastries, dry bakery products or snacks such as for example crackers, soda pastries, biscuits, potato or maize crisps (e.g. tortilla crisps), wheat flour products (e.g. bars with a biscuit centre, croutons, bread crisps, rusks, extruded and non-extruded crispbreads). Usual shapes are triangles, squares, rectangles, trapeziums, cones, cubes, rectangular parallelepipeds, cylinders, spirals, bars, spheres, disks, strips, rods, circles, balls, ovals, dishes, pyramids, octahedra, prisms or ellipses. The surfaces may, however, also be of any other shape.

It is preferable to apply the edible particles with the fixing system according to the invention on foodstuffs with larger surfaces. Typically these foodstuffs have a size greater than 10 mm, and generally the size is in the range from 20 to 100 mm.

II. Edible Particles

The term edible particles is to be understood broadly, as the nature of the particles is not critical for the function of the invention and the particles are only selected according to what taste is to be imparted to the preparations. Basically they are dry products, spices, sweeteners and/or aromatic substances. The particles may be varied widely in shape and size, and moreover the nature, composition, production or origin are not critical. Typically the size of the particles is in the range from 0.1 to 30 mm, preferably in the range from 1 to 10 mm and especially in the range from 2 to 5 mm. The particles may be taste-imparting or taste-neutral, colourful, coloured, colourless and transparent particles. The particles preferably have a low water content. If the particles originally had a high water content, they are preferably used dried (e.g. dried fruit, dried vegetables, dried meat).

Examples of suitable edible particles are roller dried flakes, powders, compacted products, capsules, agglomerates, pressed agglomerates, pellets, compacted flavourings, extrudates. The particles may also be whole, but generally comminuted foodstuffs suitable for consumption, which for example have been made into particles by grinding, crushing, grating, chopping, cutting, shaving or also by pressing, agglomeration or extrusion. We may mention for example: cheese extrudates, grated cheese, cheese analogues, vegetable particles (e.g. red, green or yellow paprika, chilli, pepperoni, onion, gherkin, tomato, olive), mushroom pieces, fruit particles (e.g. apricot, peach, apple, pear, fig, date, plum, banana, strawberry, melon, pineapple), meat or meat substitutes (e.g. salami pieces, ham cubes), herbs or herb mixtures, flavourings applied to carriers, encapsulated flavourings, particles produced by fluidized-bed granulation or spray-drying, freeze-dried extracts or flavourings, sugar or sugar products (e.g. sugar pieces, sugar beads, small tablets or bonbons), chocolates pieces or crumble, whole or comminuted nuts and the like (e.g. whole, half or crushed peanuts, ground or grated hazelnuts, almond crisps, grated coconut), sesame, poppy, caraway, sunflower seeds, unripe spelt grain, crushed pumpkin seeds, rice or rice products (e.g. puffed rice).

With the fixing system according to the invention, good, problem-free fixing is achieved even for larger and heavier particles, which may have an average diameter from about 1 to about 30 mm and preferably about 2 to about 5 mm.

III. Fixing System

Fixing systems with especially advantageous properties are characterized in that they have a glass transition temperature in the range from about 45 to about 85° C. and preferably about 30 to about 50° C. When the glass transition temperature is exceeded, transformation of a solid glass into a gum-like to viscous melt is observed. These systems melt at such low temperatures that there is no chemical impairment, and especially discolouration of the fixing ingredients or modification of the aromatic substances, whereas on cooling, vitrification is very rapid, with the advantages described at the beginning.

Via other parameters, for example viscosity, amount and composition of the fixing system, shape and diameter of the metering opening and type and manner of operation of the metering system, optimum adaptation to the particular use is possible.

Thus, for example it is also of advantage if fixing systems are used that have, at 170° C., a viscosity of less than 1000 mPas and especially from about 50 to about 300 mPas.

Regarding the fixing system, it has proved advantageous if this contains or consists of at least one carbohydrate or sugar alcohol. Excellent examples may be found among the hydrolysed starches, the mono- and disaccharides, the sugar alcohols and mixtures thereof, as will be illustrated below in preferred embodiment examples:

(a) Hydrolysed starches. Starch hydrolysates are characterized in that they have low dextrose equivalents (DE). Typical, and preferred in the sense of the invention, are hydrolysed starches with a DE below 25, especially from about 10 to about 20. The hydrolysates typically have low contents of free glucose and maltose, typically of less than 1 wt %, as described for example in U.S. Pat. No. 3,663,369. For applications in which particular sweetness is desirable, it is also possible to use starch hydrolysates with higher glucose and maltose contents, as are proposed e.g. in U.S. Pat. No. 3,849,194.

(b) Mono- and disaccharides. Monosaccharides are products of partial oxidation of polyhydric alcohols. All monosaccharides have a chain of at least three carbon atoms as skeleton structure and have one carbonyl group and at least one hydroxyl group. Based on the number of carbon atoms, they are called trioses (3), tetroses (4), pentoses (5), hexoses (6), heptoses (7) etc. In principle, the length of the carbon chain is unlimited, but so far in nature only simple sugars with at most nine carbon atoms have been observed, hexoses and pentoses being the commonest. Moreover, a carbonyl group is located on one of the carbon atoms of the non-cyclic (open-chain) form. If the carbonyl group is located at the end of the carbon chain, the sugars are called aldoses, and with a carbonyl group within the chain they are called ketoses.

Another possible way of classifying the monosaccharides is to distinguish between open-chain (aldose or ketose) sugars and cyclic sugars. The cyclic monosaccharides are hemi-acetals or hemi-ketals derived from the corresponding aldoses or ketoses.

Moreover, a distinction is made between furanoses (five-membered rings) and pyranoses (six-membered rings) in each case with an oxygen atom in the ring.

Monosaccharides with 5 or 6 carbon atoms are preferred, especially fructose, glucose and mannose.

In contrast, disaccharides have the general empirical formula $C_nH_{2n-2}O_{n-1}$. In these, in each case two monosaccharides are linked together covalently via a glycosidic bond. The disaccharide that is the economically most important and is therefore preferred in the context of the invention is cane sugar and beet sugar: sucrose. Today this is obtained industrially from sugar cane and from sugar beet, and represents an important constituent of the human diet.

(c) Sugar alcohols. Sugar alcohols, which are also known as alditols, are non-cyclic polyols of the formula $$HOCH_2[CH(OH)]_nCH_2OH,$$

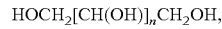

which are derived structurally as reduction products of carbohydrates. Preferred examples are mannitol, isomalt, lactitol, sorbitol, xylitol, threitol, erythritol and arabitol.

Amounts of water of up to 20 wt % and preferably about 0 to about 7.5 wt % may be added to the carbohydrates. The smaller the amount of water, the stronger the fixing.

The fixing system may moreover contain further components such as for example preservatives, antioxidants, emulsifiers, sugar substitutes, sweeteners, edible acids, dyes, colourants, pigments, flavour enhancers, flavouring materials, flavourings, nutraceuticals, trace elements, minerals, vitamins, plant extracts and ballast substances.

INDUSTRIAL USABILITY

The invention also further relates to the use of carbohydrates selected from the group of hydrolysed starches, mono- and disaccharides, sugar alcohols and mixtures thereof, having a glass transition temperature between about 45 and about 85° C., as fixing system for particles of active substances on solid foodstuff surfaces, and the use of a preparation of substances containing or consisting of (i) at least one carbohydrate selected from the group comprising hydrolysed starches, mono- and disaccharides, sugar alcohols and mixtures thereof and (ii) edible particles for applying to solid preparations ready for consumption.

In the sense of the present invention, the fixing system endows the foodstuffs with a particular gloss, which leads, especially in the case of colourful products, to brilliant colours. Moreover, after the fixing system according to the invention has solidified, the products acquire a particular texture, which may be described as crisp or crispy.

EXAMPLES

Example 1

A mixture, consisting proportionately of at least two different starch derivatives, sugar alcohols or sugar, is melted and is injected through a suitable, preheated nozzle system in a partially closed and similarly preheated reactor space. The resultant aerosol or the fine droplets that form are sprayed into a fluidized bed of edible particles, which are to be fixed on a preferred solid preparation, e.g. potato crisps, in order to wet said particles. The edible particles wetted with the fixing system are led with a temperature-controlled air stream onto the solid preparation. As a result of a temperature gradient of sufficient magnitude, the fixing system cools down, with formation of a glass matrix, and thus fixes the edible particles on the solid preparation permanently.

Example 2

A mixture, consisting proportionately of at least two different starch derivatives, sugar alcohols or sugar is melted and is cooled down in a sufficiently short time, so that a glass forms. This is ground to a powder with a grain size between 0.5 and 2 mm and sieved. The powder is melted, tomato flavouring is added, and it is injected through a suitable preheated nozzle system in a partially closed and similarly preheated reactor space. The resultant aerosol or the fine droplets that form are sprayed into a fluidized bed of edible particles, which are to be fixed on a preferred solid preparation, e.g. potato crisps, in order to wet said particles. The edible particles wetted with the fixing system are led with a temperature-controlled air stream onto the solid preparation. As a result of a temperature gradient of sufficient magnitude, the fixing system cools down, with formation of a glass matrix, and thus fixes the edible particles on the solid preparation permanently.

Examples of typical formulations are given in the following Tables 1 to 3.

Tables 1 to 3

Examples of Formulations (all data in wt %)

| Components | 1 | 2 | 3 | 4 |
|---|---|---|---|---|
| Water | | | 5 | |
| Isomalt ST-M | 50 | | 45 | |
| Isomalt ST-PF | | 50 | | |
| Isomalt GS | | | | 40 |
| Sorbitol | | 50 | | 18 |
| Mannitol | | | | 40 |
| Trehalose | | | | |
| Glucose | | | | |
| Sucrose | 50 | | 28 | |
| Maltose | | | | |
| Maltodextrin DE 5-10 | | | | |
| Maltodextrin DE 18-20 | | | 10 | |
| OSA starch derivative | | | 10 | 2 |
| Tomato flavour | | | 2 | |

| Components | 5 | 6 | 7 | 8 |
|---|---|---|---|---|
| Water | | | | |
| Isomalt ST-M | | | | |
| Isomalt ST-PF | | | | |
| Isomalt GS | 70 | | | 28 |
| Sorbitol | 10 | | | |
| Mannitol | 20 | | 58 | |
| Trehalose | | 38 | | 30 |
| Glucose | | 30 | | |
| Sucrose | | | 14 | |
| Maltose | | | 26 | 30 |
| Maltodextrin DE 5-10 | | | | |
| Maltodextrin DE 18-20 | | 30 | | 10 |
| OSA starch derivative | | | | |
| Tomato flavour | | 2 | 2 | 2 |

| Components | 9 | 10 | 11 | 12 |
|---|---|---|---|---|
| Water | | | 5 | |
| Isomalt ST-M | 50 | | 75 | |
| Isomalt ST-PF | | 50 | | |
| Isomalt GS | | | | |
| Sorbitol | | | 5 | |
| Mannitol | 50 | | | 40 |
| Trehalose | | 50 | | 20 |
| Glucose | | | | |
| Sucrose | | | 15 | |
| Maltose | | | | 40 |
| Maltodextrin DE 5-10 | | | | |
| Maltodextrin DE 18-20 | | | | |
| OSA starch derivative | | | | |
| Tomato flavour | | | | |

The invention claimed is:

1. A method of production of a solid preparation ready for consumption, on the surface of which edible particles are discretely fixed, comprising
   (a) heating a fixing system until a melt is formed,
   (b) spraying the resultant melt using one or more nozzles to form aerosol or fine droplets,
   (c) leading edible particles having an average diameter from about 0.1 to about 30 mm through the resultant aerosol or the fine droplets that form, thereby wetting the edible particles with the melt and then leading the thus-wetted edible particles onto a solid preparation with a temperature-controlled air stream, having a temperature gradient of sufficient magnitude to cool down the fixing system, and
   (d) cooling the fixing system with which the edible particles are wetted with the temperature-controlled air stream until the melt solidifies to a glass to form the solid preparation ready for consumption nonuniformly covered by the discrete, separate edible particles.

2. The method of claim 1, wherein solids are used that are selected from the group consisting of crackers, soda pastries, biscuits, potato or maize crisps, croutons and rusks.

3. The method of claim 1, comprising
using the edible particles selected from the group consisting of dry products, spices, sweeteners and aromatic substances and mixtures thereof.

4. The method of claim 1, comprising
using the fixing system having a glass transition temperature in the range from about 45 to about 85° C.

5. The method of claim 1, comprising
using the fixing system having a viscosity of less than 1000 mPas at 170° C.

6. The method of claim 1, comprising
using at least two carbohydrates as the fixing system.

7. The method of claim 6, wherein the carbohydrates are selected from the group consisting of hydrolysed starches, mono- and disaccharides, sugar alcohols and mixtures thereof.

8. The method of claim 1, comprising
leading the melt comprising the wetted edible particles and the fixing system onto the solid preparation in an amount from about 1 to about 10 wt % based on solid content of the edible preparation.

9. The method of claim 1, wherein the fixing system does not form a continuous coating on or around the solid preparation.

10. The method of claim 9, wherein the fixing system initially forms mobile capillary bridge bonds between the particles and the solid preparation which transform on cooling and vitrification into solid bridge bonds between the particles and the solid preparation, in absence of further drying.

11. The method of claim 1, comprising
covering only a part of the surface of the solid preparation with the edible particles.

12. The method of claim 10, wherein the thus-wetted particles and the fixing system are lead onto the solid preparation without a further liquid coating.

13. A method for loading discrete edible particles on solid foodstuff surfaces, comprising
wetting the edible particles with carbohydrates selected from the group consisting of hydrolysed starches, mono- and disaccharides, sugar alcohols and mixtures thereof and which have a glass transition temperature between about 45 and about 85° C., and
applying the edible particles wetted with the carbohydrates onto a solid preparation with a temperature-controlled air stream, resulting in a temperature gradient of sufficient magnitude to cool down the carbohydrates to form a solid preparation ready for consumption and nonuniformly covered by discrete, separate edible particles in absence of further drying.

14. The method of claim 13, wherein the carbohydrates do not form a continuous coating on or around the solid preparation.

15. The method of claim 14, wherein the edible particles have an average diameter from about 0.1 to about 30 mm.

16. The method of claim 14, wherein the carbohydrates initially form mobile capillary bridge bonds between the particles and the solid preparation which transform on cooling and vitrification into solid bridge bonds between the particles and the solid preparation.

17. The method of claim 13, comprising
covering only a part of the surfaces of the solid preparation with the edible particles.

18. The method of claim 16, wherein the thus-wetted particles and the carbohydrates are lead onto the solid preparation without a further liquid coating.

* * * * *